United States Patent [19]

Herzl

[11] 4,003,251
[45] Jan. 18, 1977

[54] ACCELERATION-PROOF VORTEX-TYPE FLOWMETER

[75] Inventor: Peter J. Herzl, Morrisville, Pa.

[73] Assignee: Fischer & Porter Co., Warminster, Pa.

[22] Filed: Mar. 19, 1976

[21] Appl. No.: 668,458

[52] U.S. Cl. ............................................ 73/194 VS
[51] Int. Cl.[2] ................................................ G01F 1/32
[58] Field of Search ..................... 73/194 B, 194 VS

[56] References Cited
UNITED STATES PATENTS

| 3,116,639 | 1/1964 | Bird | 73/194 |
|---|---|---|---|
| 3,867,839 | 2/1975 | Herzl | 73/194 |

*Primary Examiner*—Herbert Goldstein

[57] ABSTRACT

An acceleration-proof vortex type flowmeter in which the fluid to be measured is conducted through a flow tube having an obstacle assembly mounted therein capable of generating periodic vortices causing a deflectable section of the assembly to swing at a corresponding rate. The swing is sensed to produce an output signal whose frequency is proportional to the flow rate of the fluid. The deflectable section is cantilevered from a fixed section by upper and lower beams, the mass of the deflectable section being balanced with respect to the lower beam which acts as a torsion rod. The physical characteristics of the beams are such as to render the obstacle assembly substantially insensitive to acceleration forces.

7 Claims, 6 Drawing Figures

U.S. Patent
Jan. 18, 1977
4,003,251
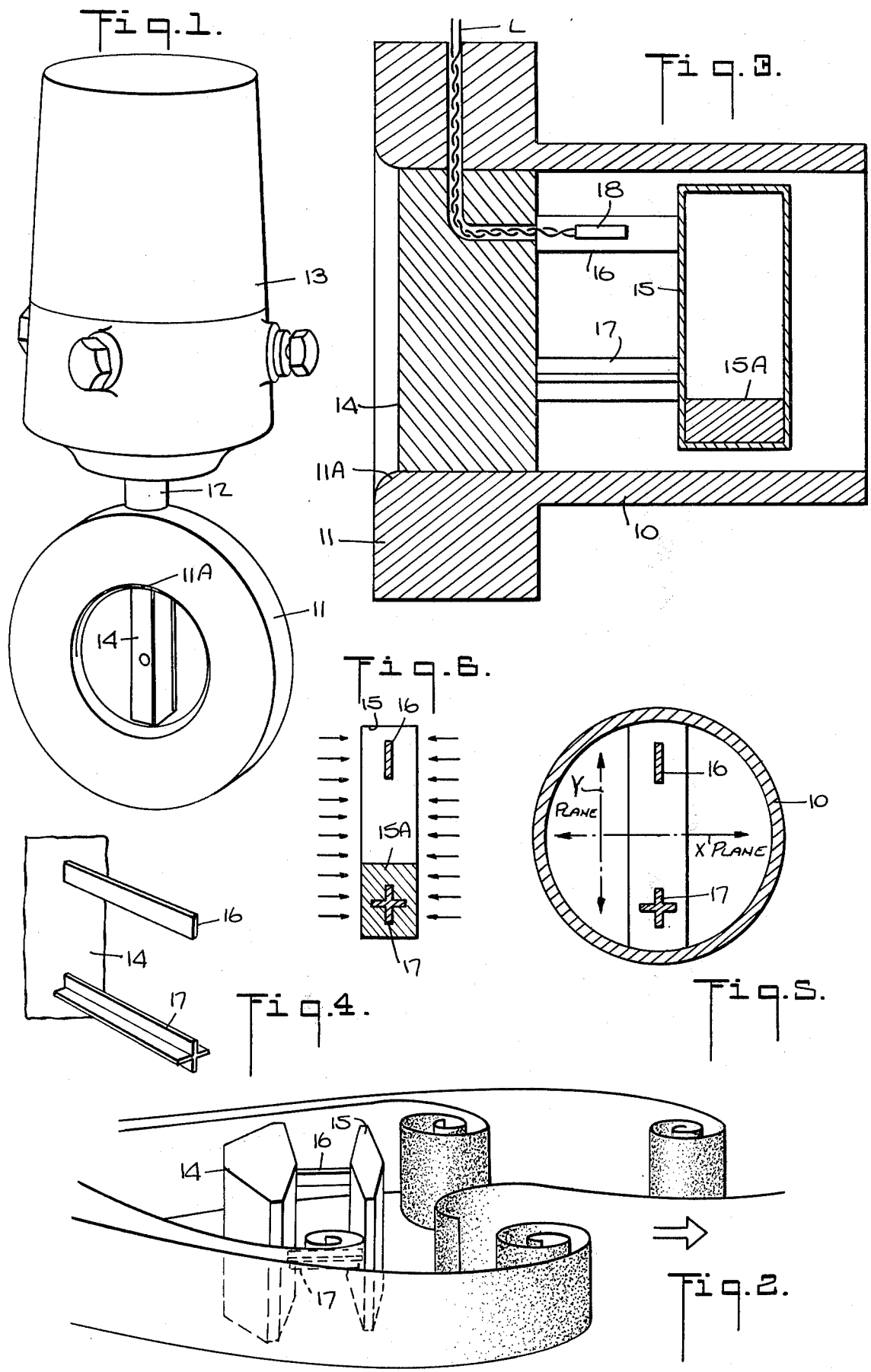

ACCELERATION-PROOF VORTEX-TYPE FLOWMETER

BACKGROUND OF INVENTION

This invention relates generally to flowmeters of the vortex-shedding type whose obstacle assembly includes a deflectable section excited into vibration by fluidic oscillations, and more particularly to a vortex meter which is substantially insensitive to acceleration forces whereby the meter provides accurate readings regardless of shock waves or other forces other than fluidic oscillations which seek to excite the deflectable section.

In many industrial processes, one must be able to measure the volumetric flow of fluids being treated or supplied in order to carry out various control functions. It is also necessary, in some instances, to determine the mass flow of the fluids. Existing types of vortex flowmeters are capable of effecting volumetric flow or mass flow measurement.

It is well known that under certain circumstances the presence of an obstacle in a flow conduit will give rise to periodic fluidic vortices. For small Reynolds numbers, the downstream wake is laminar in nature, but at increasing Reynolds numbers, regular vortex patterns are formed, these being known as Karman vortex streets. The periodicity at which vortices are shed in a Karman vortex street is a function of flow rate. In order to convert a volumetric reading to a reading of mass flow, one must multiply the volume measurement by the density of the fluid being measured.

In the Burgess Pat. No. 3,888,120, the disclosure of which is incorporated herein by reference, the obstacle assembly mounted in a flow tube through which the fluid to be metered is conducted is formed by a front section fixedly mounted across the tube and a rear section cantilevered from the front section by means of a flexible beam to define a gap serving to trap the Karman vortices. Because the rear section is deflectable, it is excited into mechanical vibration by the vortices at a rate whose frequency is proportional to fluid flow.

In the Vortex Flowmeter Model 10 LV 1000 manufactured by the Fischer and Porter Company of Warminster, Pennsylvania, the assignee of Burgess Pat. No. 3,888,120 as well as of the present application, a strain-gauge cartridge is used to sense the deflection of the rear section in relation to the fixed front section of an obstacle assembly. This strain-gauge sensor is constituted by a steel beam having a pair of high-impedance, semi-conductor strain gauges glass-bonded thereto. The characteristics of these gauges are such as to give rise to resistance changes of 0.66% for a 0.001 inch deflection at the tip of the cartridge, so that the sensor is highly sensitive and produces an electrical signal whose amplitude and frequency depends on flow rate.

In a 10 LV 100 model vortex meter and in commercially-available meters operating on similar principles, the relatively heavy deflectable section of the obstacle assembly which is suspended from a single beam has freedom of motion in two planes. The deflectable section is free to move from side-to-side with respect to its neutral position in a lateral plane, hereinafter referred to as the X plane. It can also move up-and-down with respect to its neutral position in an axial plane, hereinafter referred to as the Y plane.

When the deflectable section moves in either the X or Y plane, bending of the beam occurs. This bending action imposes a strain on the beam-mounted sensor to generate an output signal which reflects the extent of movement and the frequency or repetition rate thereof.

In normal operation, the flow of fluid past the obstacle assembly produces vortex shedding, giving rise to a fluidic force which alternates from one side of the deflectable section to the other, thereby causing this section to vibrate in the X plane at a frequency proportional to flow rate.

When, however, the vortex meter is installed in a pipeline, it may in certain cases be subject to acceleration forces. Thus in a field installation in which the meter is included in the piping of a large industrial process system which incorporates heavy machinery or explosive activity, vibratory or shock wave forces may be transmitted by the piping to the meter. These extraneous forces are picked up by the meter and cause the beam-supported deflectable section to behave in a manner comparable to the spring-mounted inertial mass of an accelerometer to produce an output signal that is a function of acceleration forces applied in the X and Y planes.

Hence in a field installation in which the vortex meter is exposed to acceleration forces, the output signal will not accurately reflect flow rate, for this signal is a composite which includes a spurious acceleration component.

SUMMARY OF INVENTION

In view of the foregoing, it is the main object of this invention to provide an acceleration-proof vortex flowmeter having a deflectable section, whereby the meter yields accurate flow rate readings even under vigorous field conditions.

More specifically, it is an object of this invention to provide a vortex flowmeter which operates efficiently and accurately and whose structure is rendered immune to acceleration forces at relatively low cost, the deflectable section of the obstacle assembly being cantilevered from a fixed section thereof by spaced beams whose physical characteristics are such as to cause this section to swing about a fulcrum.

A significant feature of the invention is that the deflectable section of the obstacle assembly, instead of vibrating from side to side with respect to its neutral position as in a conventional meter, is effectively fulcrumed to swing back and forth on one of the beams acting as a torsion bar.

Briefly stated, these objects are accomplished in a vortex meter having an obstacle assembly whose deflectable section is cantilevered from a fixed section by means of upper and lower beams attached to the upper and lower end portions of the deflectable section. The physical characteristics of the upper beam are such that this beam is weak and therefore bendable in the X plane defined by side-to-side movement of the deflectable section with respect to its neutral position and is stiff and unbendable in the Y plane defined by up and down movement, the upper beam being weak torsionally. The physical characteristics of the lower beam are such that this beam is stiff in both the Y and X planes and is weak torsionally. Thus the lower beam cannot be bent by the deflectable section but can only be twisted thereby.

The body of the deflectable section is such that it is relatively heavy in the lower portion thereof, the remainder of the section being light to establish a mass-balance about the lower beam which acts as a torsion rod fulcrum. When vortices are produced by fluid passing by the obstacle assembly, fluidic forces are alternately applied from one side of the deflectable section to the other and a torque is developed about the torsional lower beam causing the deflectable section to swing back and forth.

Because movement in the Y plane is resisted by both beams, the meter is substantially insensitive to an acceleration force in this plane. And because the deflectable section is mass-balanced about the lower beam, an acceleration force in the X plane imposes no net force on the upper beam which is bendable in this plane; hence the meter is also substantially insensitive to an acceleration force in the X plane.

OUTLINE OF DRAWING

For a better understanding of the invention as well as other objects and further features thereof, reference is made to the following detailed description to be read in conjunction with the accompanying drawings, wherein:

FIG. 1 is a perspective view of a vortex-type flowmeter which incorporates a preferred embodiment of an obstacle assembly in accordance with the invention;

FIG. 2 illustrates the nature of the vortices generated in the flowmeter;

FIG. 3 is a section taken through the obstacle assembly of the flowmeter;

FIG. 4 is a perspective view of the two beams from which the deflectable element of the assembly is suspended;

FIG. 5 is a section taken in the plane indicated by line 5—5 in FIG. 3; and

FIG. 6 schematically illustrates the fluidic forces applied to the deflectable section.

DESCRIPTION OF INVENTION

Referring now to the drawings and more particularly to FIG. 1 to 3, there is shown a vortex-shedding flowmeter which incorporates an obstacle assembly in accordance with the invention, the meter including a flow tube 10 through which is conducted the fluid whose flow rate is to be measured. Tube 10 is provided at its inlet side with a flange 11 of enlarged outer diameter. The inlet 11A of the flow tube is chamfered to provide a smooth flow transition from the upstream pipe. Mounted vertically on flange 11 by a stub pipe 12 is a signal conditioner housing 13, the signal conditioner being coupled through the stub pipe to the sensor within the flowmeter.

This flowmeter is installed in the manner disclosed in greater detail in a copending application of Burgess Ser. No. 493,855, filed Aug. 1, 1974, by interposing it in a flow line constituted by an upstream pipe section and a downstream pipe section. The two pipe sections have complementary mounting flanges and a circular series of bores therein to accommodate bolts.

The meter is installed by telescoping flow tube 10 into the downstream pipe section and then clamping meter flange 11 between the upstream and downstream mounting flanges by means of the bolts intercoupling the pipe flanges which form a cage encircling and abutting the periphery of the meter flange and acting to center the flow tube within the downstream pipe section. Gaskets are sandwiched between the meter flange and the pipe flange to prevent fluid leakage.

Vertically mounted with flow tube 10 is an obstacle assembly formed by a contoured front section 14 and a rear section 15 cantilevered from the front section by upper and lower beams 16 and 17 whose physical characteristics will be later described. Front section 14 is a contoured block having a delta-shaped cross-section which is uniform throughout the longitudinal axis of the block, this axis being perpendicular to the flow axis of the flow tube. The extremities of front section 14 are attached to the wall of flow tube flange 11, whereby the front section is fixedly held within the flow tube, whereas the cantilevered rear section 15 of the obstacle assembly is deflectable.

As illustrated in FIG. 2, the apex of front section 14 faces the incoming fluid, the inclined sides thereof forming leading edges which are swept by the flow of fluid and divide the stream to create a series of vortices that alternate with respect to the center line of the front section. As the vortices detach themselves from the front section, alternate areas of low pressure are created that shift from side to side, producing an oscillating thrust behind the front section and causing the deflectable rear section which is suspended by beams 16 and 17 to swing periodically at a frequency that is linearly proportional to the incoming fluid velocity. The swing of the deflectable section is about the lower beam 17 acting as a torsion rod, the periodic swing being sensed by a strain gauge sensor 18 mounted on the upper beam 18. Leads L to the sensor may be connected to external terminals in signal conditioner 13 through an internal passage in front section 14.

The physical characteristics of upper beam 16 are such that the beam is relatively weak and therefore bendable in the X-plane defined by side-to-side or lateral movement of the deflectable section 15 with respect to its neutral position of suspension at rear of fixed section 14. This plane is indicated by the X-marked arrows in FIG. 5. The upper beam is stiff and therefore unbendable in the Y plane defined by up-and-down or axial movement of the deflectable section relative to its neutral position, as indicated by the arrows marked Y. The upper beam is weak torsionally.

In practice, these characteristics are preferably attained by an upper beam in the form of a single flat strip of flexible metal which is vertically oriented so that the strip is readily bendable in the X-plane but is virtually unbendable in the Y plane. Because this strip is twistable, it is weak torsionally.

The physical characteristics of lower beam 17 are such that this beam is stiff both in the X and Y-planes and is weak torsionally, so that this beam cannot be sent from side-to-side or up-and-down, but it can readily be twisted. These characteristics are attained by a beam having a cruciform cross-section which is effectively formed by crossed strips of flexible metal, one strip being vertically oriented and the other horizontally, so that the horizontal strip resists bending of the vertical strip in the X-plane, and the vertical strip resists bending of the horizontal strip in the Y-plane. But this cruciform beam can readily be twisted, and is adapted, therefore, to serve as a torsion-rod fulcrum for the deflectable section suspended therefrom.

Deflectable section 15 is constituted by a body of hollow construction and is weighted in its lower position with a mass 15A which may be made of lead or other heavy substance, the remainder of the body being light-weight. The uneven weight distribution of the deflectable section is made such that a mass-balance is obtained about lower beam 17. Beam 17 acts as a torsion rod and serves as a fulcrum point P, as indicated in FIG. 6, about which the deflectable section is swingable.

As shown in FIG. 6, the vortex-shedding phenomenon produces a uniform fluidic force which alternates from one side of deflectable section 15 to the other. Had this section been mounted on a single flexible beam, as in prior-art arrangements, the deflectable section would be excited into vibration from side-to-side in the X-plane in synchronism with the alternating fluidic forces.

However, though upper beam 16 permits movement of the deflectable section in the X-plane, lower beam 17 resists such movement, as a consequence of which a torque is produced causing the deflectable section to swing back and forth about the torsional lower beam. As the deflectable section swings, the accompanying bending action of upper beam 16 in the X-plane produces a bending strain on sensor 18 whose output signal has a frequency corresponding to the rate of swing.

If, as a result of shock waves or mechanical vibrations transmitted to the meter through the piping, an acceleration force is applied in the Y-plane, this force will not affect deflection section 15, for the beams on which it is suspended are inherently stiff and unbendable in this plane; hence no signal is produced in response to this acceleration force. Any remaining strain which would occur due to an acceleration force in the Y-plane can be rejected by proper design of the sensing system.

If, on the other hand, an acceleration force is applied in the X-plane, it cannot cause bending of the lower beam which is unbendable in this plane. Nor does it result in bending of the upper beam even though the beam is bendable in the X-plane, for the structure is mass-balanced around the lower beam which is unbendable in this plane.

Thus while the deflectable section of the obstacle assembly is highly responsive to forces arising from fluidic oscillation, it is substantially immune to acceleration forces so that the meter is effectively acceleration-proof.

While there has been shown and described a preferred embodiment of an acceleration-proof vortex-type flowmeter in accordance with the invention, it will be appreciated that many changes and modifications may be made therein without, however, departing from the essential spirit thereof.

For example, instead of sensing the movement of the deflectable section by means of a strain gauge mounted on the bendable upper beam, the movement may be detected by means of a torsion sensor mounted on the unbendable lower beam which functions as a torsion rod. Also, while the deflectable section has been shown suspended at the rear of the fixed section, in practice it may be in front of the fixed section.

I claim:

1. An acceleration-proof vortex-type flowmeter comprising:
    A. a flow tube through which the fluid to be metered is conducted;
    B. a vortex-shedding obstacle assembly disposed in said tube, said assembly having a first section fixedly supported across said tube and a second section deflectably suspended from the first section by upper and lower beams secured to the upper and lower end portions of the second section, said upper beam being bendable in an X-plane defined by movement of the deflectable section from side-to-side with respect to its neutral position and being unbendable in a Y-plane defined by movement of the deflectable section up-and-down with respect to its neutral position, said lower beam being unbendable in the X and Y planes, both beams being twistable, the mass of said deflectable section being balanced about said lower beam which acts as a torsion rod fulcrum, whereby vortex-shedding results in fluidic forces which are applied alternately to one side and the other of said deflectable section and produces a torque about the lower beam causing the deflectable section to swing on the lower beam at a frequency depending on the periodicity of said fluidic forces; and
    C. means to sense the swing of said deflectable section to provide an output signal reflecting flow rate, said deflectable section being insensitive to acceleration forces applied in the Y-plane, in that both beams are unbendable in this plane, said deflectable section being insensitive to acceleration forces applied in the X-plane in that while the upper beam is bendable in this plane, the lower beam above which the deflectable section is mass-balanced is not bendable in the X-plane and acceleration in the X-plane imposes no net force on the upper beam.

2. A flowmeter as set forth in claim 1, wherein said sensing means is constituted by a strain gauge mounted on the upper beam.

3. A flowmeter as set forth in claim 1, wherein said sensed means is constituted by a torsion gauge mounted on the lower beam.

4. A flowmeter as set forth in claim 1, wherein said fixed first section is at the front of the obstacle assembly and the deflectable section is at the rear thereof.

5. A flowmeter as set forth in claim 1, wherein said upper beam is formed by a strip of flexible metal.

6. A flowmeter as set forth in claim 1, wherein said lower beam has a cruciform cross-section formed of metal strips.

7. A flowmeter as set forth in claim 1, wherein said deflectable section is hollow and has a weight therein at the lower portion to provide mass-balance about said lower beam.

* * * * *